United States Patent
Miki et al.

(10) Patent No.: US 7,277,147 B2
(45) Date of Patent: Oct. 2, 2007

(54) LIQUID CRYSTAL DISPLAY DRIVEN BY ONE DRIVING IC

(75) Inventors: Yasuhiro Miki, Fukushima-ken (JP); Yoshifumi Masumoto, Fukushima-ken (JP); Takahito Mafune, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/395,932

(22) Filed: Mar. 24, 2003

(65) Prior Publication Data

US 2005/0259208 A1   Nov. 24, 2005

(30) Foreign Application Priority Data

Mar. 25, 2002   (JP) ............................. 2002-084454

(51) Int. Cl.
   *G02F 1/1335*   (2006.01)
(52) U.S. Cl. ...................... 349/137; 349/152; 349/147
(58) Field of Classification Search ............... 349/149, 349/137, 151, 152

See application file for complete search history.

(56) References Cited

U.S. PATENT DOCUMENTS

| | | | | | |
|---|---|---|---|---|---|
| 4,556,288 | A | * | 12/1985 | Sekimura | 349/137 |
| 4,824,213 | A | * | 4/1989 | Morokawa | 349/111 |
| 5,831,693 | A | * | 11/1998 | McCartney et al. | 349/42 |
| 6,590,623 | B2 | * | 7/2003 | Ono et al. | 349/43 |
| 2002/0015127 | A1 | * | 2/2002 | Hagiwara | 349/149 |

FOREIGN PATENT DOCUMENTS

JP   2000-171819   6/2000

* cited by examiner

*Primary Examiner*—David Nelms
*Assistant Examiner*—Richard H Kim
(74) *Attorney, Agent, or Firm*—Brinks Hofer Gilson & Lione

(57) ABSTRACT

A liquid crystal display includes a pair of opposing substrates in which a liquid crystal layer is disposed therebetween. Transparent electrodes are disposed on the surfaces on the liquid crystal layer sides of the substrates and lead-out wiring leads out the transparent electrodes. The lead-out wiring are formed on one substrate. At least a part of the lead-out wiring is formed by a combination of at least a transparent conductive layer and a conductive reflection-preventing layer.

14 Claims, 4 Drawing Sheets

LIQUID CRYSTAL DISPLAY DRIVEN BY ONE DRIVING IC

BACKGROUND OF THE INVENTION

1. Field of the Invention

The present invention relates to a liquid crystal display, and more particularly, to a liquid crystal display that has an improved display performance (image appearance) by reducing the reflection factor of lead-out wiring.

2. Description of the Related Art

In order to address recent trends toward the miniaturization and cost-reduction of electronic devices, a STN (Super-Twisted Nematic) liquid crystal display in which two driving ICs are combined into a single driving IC, is in use. Specifically, in this type of liquid crystal display, the driving ICs that were connected to the conventional transparent electrodes on the common side and segment side are replaced by a single driving IC located on only one side surface of a panel.

In such a liquid crystal display, a terminal portion is formed on one substrate out of a pair of substrates between which a liquid crystal layer is sandwiched. Each of the transparent electrodes on the common side and segment side must be connected to this terminal portion, and the terminal portion and each of the transparent electrodes have hitherto been connected by forming lead-out wiring of a transparent conductive material such as ITO (Indium Tin Oxide).

In recent liquid crystal displays, a time-division multiplex system has been adopted to drive the display. Further, the liquid crystal display is driven using multi-gradation control, and therefore, the deviation of the driving voltage must be minimized. However, when the lead-out wiring is formed of ITO or similar materials, which have a relatively high specific resistance, reduction in the deviation of the driving voltage is difficult to obtain. This causes uneven display such that the display in a display area at a relatively far distance from the terminal portion becomes paler in color. In particular, depending on the length of the lead-out wiring, the resistance of the lead-out wiring itself might become as high as a dozen or so mega ohms (MΩ), which is comparable to the resistance value of an electrical insulator. Such a large resistance makes it extremely difficult to drive the liquid crystal display.

On the other hand, when the width of the lead-out wiring is increased to decrease the resistance of the wiring, the area from the display area, which is the forming area of the lead-out wiring, up to the product outer shape portion (the area other than the display area) may disadvantageously increase.

Accordingly, in recent years, a technique is under development that improves the conductivity of the transparent electrodes by providing a metal film along each of the transparent electrodes on the common side and segment side. By increasing the conductivity of the wiring, uneven display may be prevented and the forming area of the lead-out wiring may be reduced.

However, when a metal film is provided along each of the transparent electrodes, the amount of reflected light increases because of a high reflection factor of the metal film. Particularly in reflection-type liquid crystal displays, this poses a problem in that the display performance thereof degrades under the influence of reflected light.

SUMMARY OF THE INVENTION

It is, therefore, an object of the present invention to provide a liquid crystal display that has a superior display performance by preventing the occurrence of uneven display and enhancing the image contrast.

In order to achieve the above-described object, the present invention provides a liquid crystal display that includes first and second substrates opposed to each other with a liquid crystal layer therebetween; first and second transparent electrodes disposed on surfaces on the liquid crystal layer sides of the first and second substrates, respectively; and first and second other lead-out wiring each that leads out the respective one of the first and second transparent electrodes to a terminal portion of the first substrate, the lead-out wiring being formed on either one of the substrates or on both of the substrates. Herein, at least a part or all of the first and second lead-out wiring is formed by laminating at least a transparent conductive layer and a conductive reflection-preventing layer.

According to the liquid crystal display with the above-described features, since at least a part or all of the one and other lead-out wiring is formed by laminating at least a transparent conductive layer and a conductive reflection-preventing layer, the amount of reflected light from the lead-out wiring can be reduced by virtue of the conductive reflection-preventing layer, thereby allowing a liquid crystal display with high display performance to be achieved.

Furthermore, since the conductive reflection-preventing layer is laminated on the transparent conductive layer, the conductivity of lead-out wiring itself is improved, thereby preventing the occurrence of uneven display of the liquid crystal display.

In the liquid crystal display according to the present invention, it is preferable that an anisotropic conductive resin be formed into a loop shape between the first and second substrates, and that the liquid crystal layer be sandwiched between the substrates in a state in which the liquid crystal layer is disposed inside the loop-shaped anisotropic conductive resin. The anisotropic conductive resin preferably comprises conductive particles and binder resin. Furthermore, it is preferable that the first and second lead-out electrodes are formed on the first substrate, as well as the second transparent electrode and the second lead-out wiring are electrically interconnected by the anisotropic conductive resin.

According to the liquid crystal display with above-described features, by interconnecting the second transparent electrode and the second lead-out wiring via the anisotropic conductive resin, it is possible to lead out the transparent electrode onto first substrate via the lead-out wiring, and therefore, the first and second transparent electrodes can be electrically connected at the terminal portion of the first substrate. This allows driving ICs to be combined into a single driving IC.

By forming lead-out wiring with a satisfactory conductance, the area of lead-out wiring from the display area up to the product outer shape portion (the area other than the display area) can be reduced. This makes it possible to achieve a small product outer shape portion (area other than the display area) with respect to a large display area.

Also, in the liquid crystal display according to the present invention, preferably, the conductive reflection-preventing layer constituting the lead-out wiring is disposed further toward the display surface side than the transparent conductive layer.

According to the liquid crystal display with the above-described features, since the conductive reflection-preventing layer is disposed on the display surface side, that is, on the side of the observer of the display, the amount of reflected light from the lead-out wiring can be reduced more effectively, thereby enabling a liquid crystal display with high display performance to be attained.

Moreover, in the liquid crystal display according to the present invention, preferably, the conductive reflection-preventing layer is a laminated film formed of a metal film and a low-reflective metal oxide film, or is formed of a low-reflective metal film alone.

According to the liquid crystal display with the described features, since the conductive reflection-preventing layer has the above-mentioned constitution, the conductivity of the lead-out wiring is improved, as well as the reflection factor of the lead-out wiring itself is suppressed, which results in an improved display performance of the liquid crystal display.

The liquid crystal display may also comprise phase difference plates and polarizing plates formed on a side of the first and second substrates distal to the liquid crystal layer, a first overcoat layer formed on the first transparent electrodes and a first alignment layer formed on the first overcoat layer and adjacent to the liquid crystal layer, a second overcoat layer formed on a reflector containing organic and metal films, the second transparent electrodes formed on the second overcoat layer, and a second alignment layer formed on the second overcoat layer and second transparent electrodes and adjacent to the liquid crystal layer.

In another embodiment, a method of driving the liquid crystal display using a single IC driver comprises fabricating a first and second lead-out wiring on one of two opposing substrates having a liquid crystal layer disposed therebetween such that at least a part of the first and second lead-out wiring contains a transparent conductive layer and a conductive reflection-preventing layer, fabricating first and second transparent electrodes disposed on liquid crystal layer sides of the opposing substrates, and electrically connecting the first and second transparent electrodes to a terminal portion of one of the substrates via the first and second lead-out wiring, the terminal portion configured to house the IC driver.

The method may further comprise establishing a boundary of an anisotropic conductive resin between the substrates within which the liquid crystal layer is disposed and electrically connecting the second transparent electrode and second lead-out wiring though the anisotropic conductive resin.

The method may further comprise forming the part of the first and second lead-out-wiring such that the conductive reflection-preventing layer is disposed more proximate to a display surface side of the liquid crystal display than the transparent conductive layer.

The method may further comprise laminating a metal film and a low-reflective metal oxide film to form the conductive reflection-preventing layer or forming the conductive reflection-preventing layer from a single layer low-reflective metal film.

The above and other objects, features, and advantages of the present invention will become clear from the following detailed description of the preferred embodiments of the invention in conjunction with the accompanying drawings.

DESCRIPTION OF THE PREFERRED EMBODIMENTS

Hereinafter the embodiment according to the present invention will be described with reference to the accompanying drawings.

Figure 1:
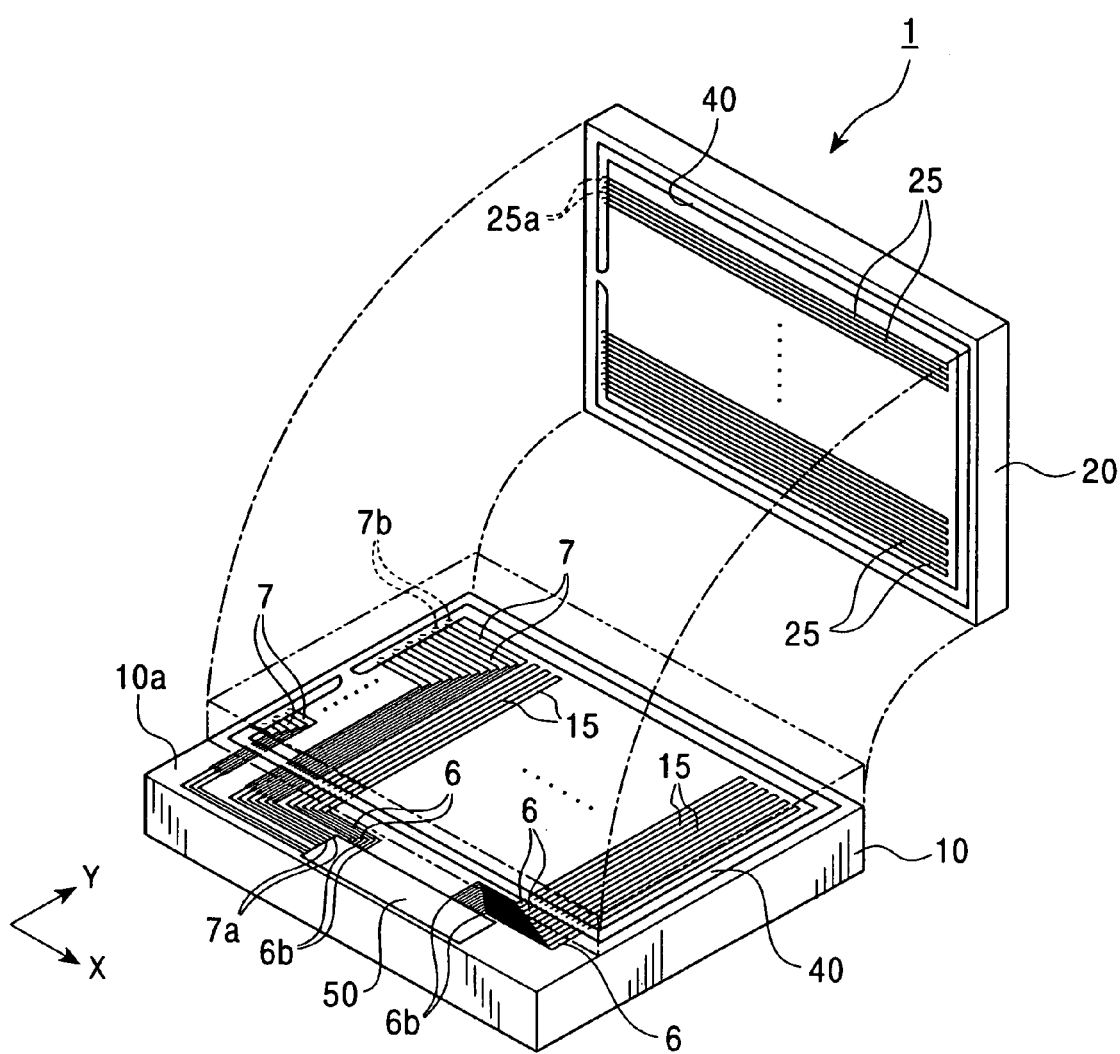
FIG. 1 is an exploded perspective view showing an embodiment of a liquid crystal display according to the present invention.
Figure 2:
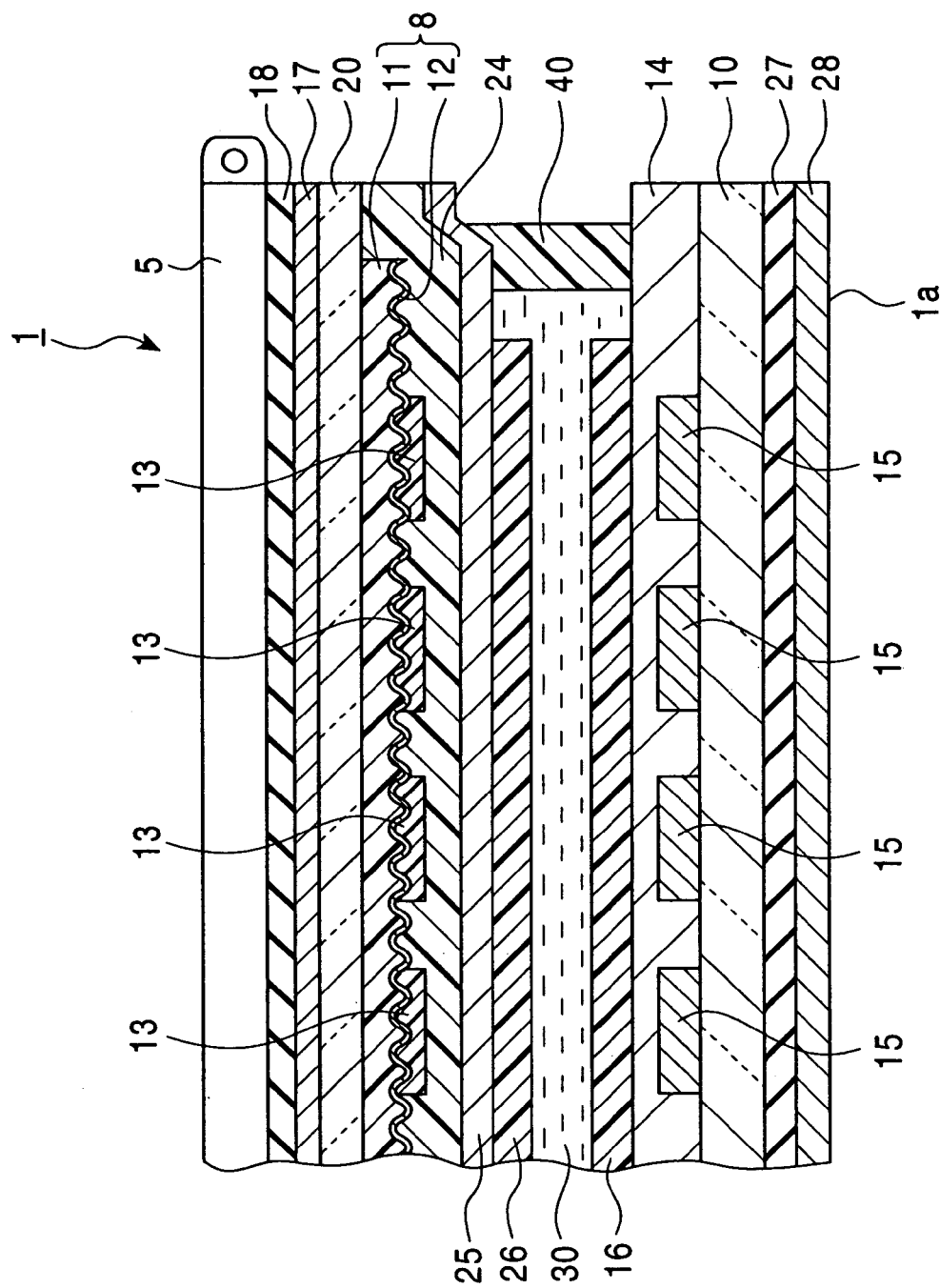
FIG. 2 is a schematic view showing a partial sectional structure including the end portions of the embodiment of the liquid crystal display according to the present invention.
Figure 3:
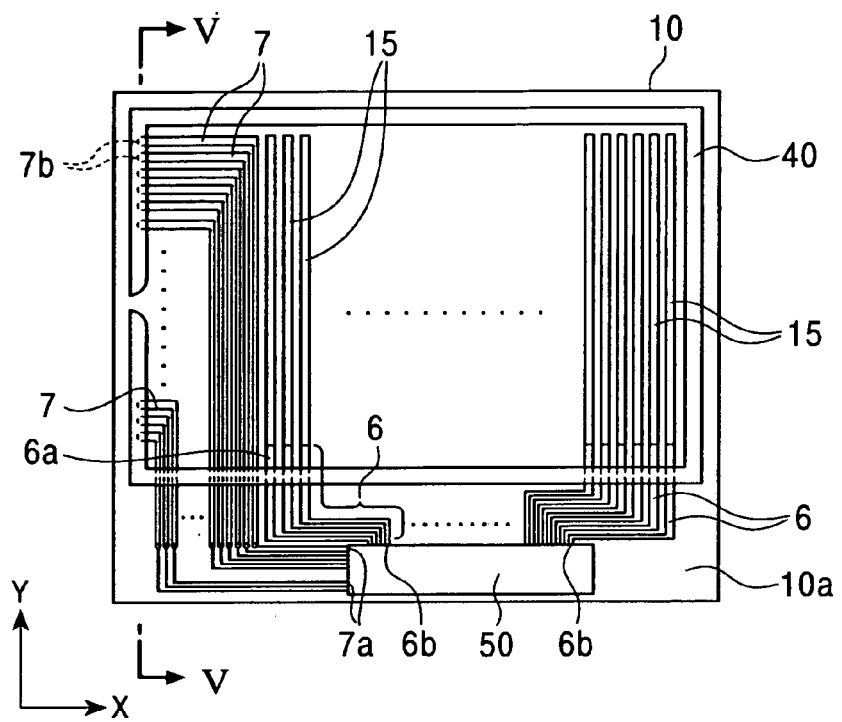
FIG. 3 is a plan view illustrating one substrate constituting the liquid crystal display shown in FIG. 1.
Figure 4:
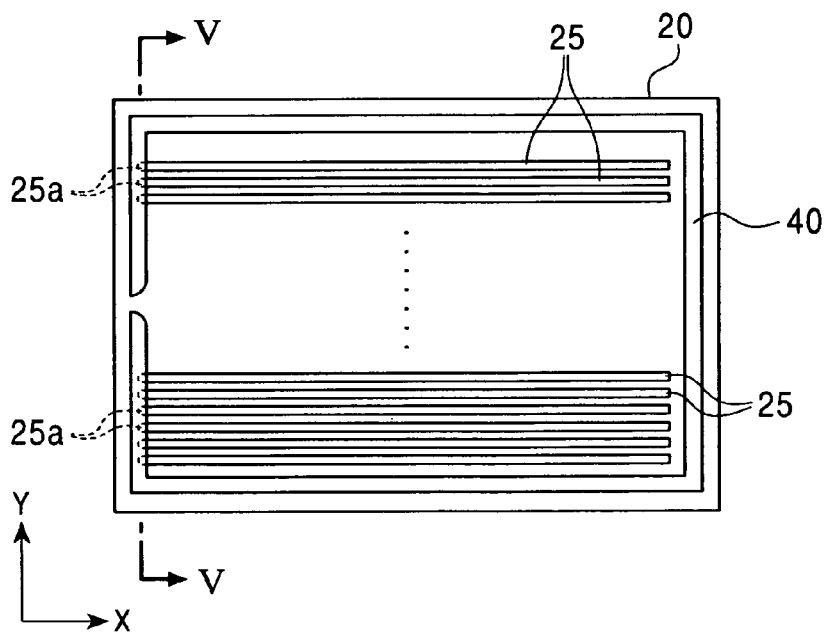
FIG. 4 is a plan view illustrating the other substrate constituting the liquid crystal display shown in FIG. 1.

FIG. 1 is an exploded perspective view showing a simple matrix type liquid crystal display as the embodiment of the present invention, and FIG. 2 is a schematic view showing a partial sectional structure including the end portions of the liquid crystal display of the present embodiment. FIG. 3 is a plan view illustrating one substrate constituting the liquid crystal display shown in FIG. 1, and FIG. 4 is a plan view illustrating the other substrate constituting the liquid crystal display shown in FIG. 1.

As shown in FIGS. 1 and 2, the liquid crystal display 1 according to the present invention includes a first substrate 10 and a second substrate 20 opposed to each other with a liquid crystal layer 30 therebetween. A first transparent electrode 15 and a second transparent electrode 25 are disposed on the surfaces on the liquid crystal layer 30 sides of the substrates 10 and 20, respectively. A resin containing conductive particles (an anisotropic conductive resin) 40 is formed into a loop shape between the substrates 10 and 20, and the liquid crystal layer 30-is sandwiched between the substrates 10 and 20 in a state in which the liquid crystal layer 30 is disposed inside the loop-shaped anisotropic conductive resin 40.

As illustrated in FIGS. 1 and 2, the first transparent electrode 15 extends in the Y direction (longitudinal direction) while the second transparent electrode 25 extends in the X direction (width direction). The first and second electrodes drive the liquid crystal layer 30.

An overcoat film 14 that levels off the projections and depressions by the transparent electrode 15 and an alignment film 16 that controls the alignment of liquid crystal molecules constituting the liquid crystal layer 30 are laminated in this order from the substrate 10 side toward the liquid crystal layer 30. Similarly, a reflector 8, a color filter 13 for color display, an overcoat film 24 that covers and protects the reflector 8 and that levels off the projections and depressions created by the reflector 8 and color filter 13 and an alignment film 26 that controls the alignment of liquid crystal molecules constituting the liquid crystal layer 30 are laminated in this order from the substrate 20 side toward the liquid crystal layer 30.

In one embodiment, the reflector 8 is formed of an organic film 11 and a metal reflecting film 12 is formed on the organic film 11.

A phase difference plate 17 and polarizing plate 18 are provided on the side of the second substrate 20 that is distal from the liquid crystal layer 30. Similarly, a phase difference plate 27 and polarizing plate 28 are stacked in this order on the side of the first substrate 10 that is distal from the liquid crystal layer 30. The external surface of the polarizing plate 28 provides a display surface 1a. Outside the polarizing plate 18, there a backlight 5 is provided. The backlight 5 serves as a light source for performing a transparent display in the liquid crystal display 1.

Each of the transparent electrodes 15 and 25 is formed by aligning large numbers of long strips of a transparent conductive film such as an ITO film that are a planar shape in a plan view. The strips of each of the transparent electrodes 15 and 25 are individually connected to a driving IC 50, and are arranged to drive the liquid crystal molecules constituting the liquid crystal layer 30. The transparent electrodes 15 and 25 are disposed such that they are perpendicular to each other in a plan view, so that the above-described liquid crystal 1 is referred to as a passive matrix type.

As shown in FIG. 1, the length of the second substrate 20 in the width direction is equal to that of the first substrate 10 in the width direction. On the other hand, the length of the second substrate 20 in the longitudinal direction is shorter than that of the first substrate 10 in the longitudinal direction. As a result, when the substrates 10 and 20 are superimposed, one portion (a terminal portion) 10a of the surface on the liquid crystal layer 30 side of the first substrate 10 is exposed. The driving IC 50 is attached onto this terminal portion 10a.

As illustrated in FIGS. 1 and 3, lead-out wiring 6 (first lead-out wiring) that leads out, i.e. electrically connects, the first transparent electrode 15 to the terminal portion 10a is formed on the first substrate 10. One end 6a of the lead-out wiring 6 is connected to the transparent electrode 15, and the other end 6b thereof is connected to the driving IC 50.

As illustrated in FIGS. 1 and 4, the second transparent electrode 25 extends along the X direction and is formed on the second substrate 20. A first end 25a of this transparent electrode 25 extends to the position of the anisotropic conductive resin 40 located outside the forming area of the alignment film 26. Also, as shown in FIG. 3, lead-out wiring 7 (second lead-out wiring) is formed on the first substrate 10. One end 7a (the back end 7a) of this lead-out wiring 7 is connected to the driving IC 50, and in the inside area (the display area) surrounded by the anisotropic conductive resin 40, the lead-out wiring 7 extends substantially along the Y direction. In addition, in this area the lead-out wiring 7 is bent in the X direction and aligned such that the front end (the other end 7b) of the lead-out wiring 7 intersects the anisotropic conductive resin 40. Such an arrangement helps to maximize the area in which the transparent electrodes 15 are positioned, thereby reducing overall product size. The lead-out wiring 7 is arranged so that, when the first and second substrates 10 and 20 are laminated with the liquid crystal layer 30 therebetween, the front end 7b of the lead-out wiring 7 is superimposed on the first end 25a of the transparent electrode 25.

Figure 5:
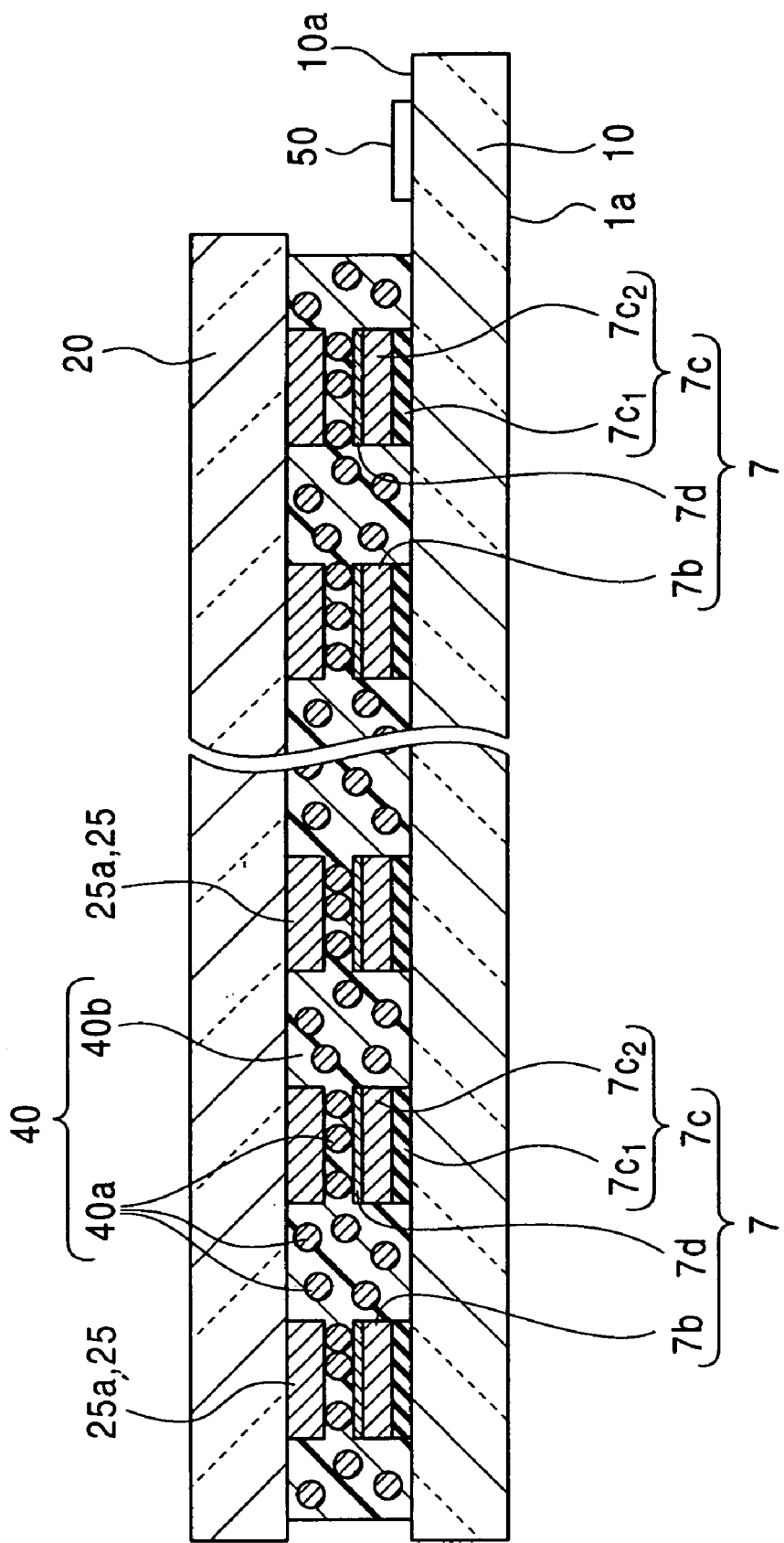
FIG. 5 is a schematic sectional view taken along the line V-V shown in FIGS. 3 and 4.

FIG. 5 is a schematic sectional view taken along the line V-V shown in FIGS. 3 and 4. As illustrated in FIG. 5, by forming the lead-out wiring lines 7 on the first substrate 10, a concavo-convex surface in which the sections of the lead-out wiring lines 7 provides projections, is created. Similarly, by forming the strips of the transparent electrode 25 on the second substrate 20, a concavo-convex surface in which the sections of the strips of the transparent electrode 25 provides projections, is created. Each of the first ends 25a of the strips of the transparent electrode 25 opposes one of the front ends 7b of the lead-out wiring lines 7. In other words, the respective corresponding projections of one of the first ends 25a of the strips of the transparent electrode 25 and one of the front ends 7b of the lead-out wiring lines 7 oppose each other and are electrically connected with the anisotropic conductive resin 40 therebetween. The anisotropic conductive resin 40 contains conductive particles 40a of metal or a similar conductive material and binder resin 40b. The electrical connection between the transparent electrode 25 and the lead-out wiring 7 is established by inserting the conductive particles 40a into the portions where the above-described first ends 25a and the front ends 7b are mutually opposed.

As shown in FIG. 5, the lead-out-wiring 7 contains a conductive reflection-preventing layer 7c and a transparent conductive layer 7d laminated on the conductive reflection-preventing layer 7c. The conductive reflection-preventing layer 7c, in turn, includes a low-reflective metal oxide film 7c1 and a metal film 7c2 formed on the low-reflective metal oxide film 7c1.

The transparent conductive layer 7d contains, for example, a transparent conductive material such as ITO, as in the case of the transparent electrodes 15 and 25. The conductive reflection-preventing layer 7c provides the transparent conductive layer 7d as well as to the lead-out wiring 7 with adequate conductivity. Simultaneously, because the conductive reflection-preventing layer 7c is situated further toward the display surface 1a side than the transparent conductive layer 7d, the conductive reflection-preventing layer 7c reduces the reflection factor of the lead-out wiring 7 itself to thereby decrease the amount of reflected light from the lead-out wiring 7 to the display surface 1a side. In this embodiment, the metal film 7c2 imparts conductivity to the lead-out wiring 7 while the low-reflective metal oxide film 7c1 reduces the reflection factor of the lead-out wiring 7.

More specifically, laminating the metal film 7c2 on the transparent conductive layer 7d improves the conductivity of lead-out wiring 7, and further, forming the low-reflective metal oxide film 7c1 on the one side of the metal film 7c2 reduces the reflection factor of the lead-out wiring 7 as compared with the case of the metal film 7c2 alone. In order to reduce the reflection factor of the lead-out wiring 7 on the display surface 1a side, it is desirable for the low-reflective metal oxide film 7c1 to be formed at the position nearest to the substrate 10.

In one example, chromium may be employed as a material for the metal film 7c2 while chromium oxide is used as a material for the low-reflective metal oxide film 7c1.

The thickness of the metal film 7c2 is preferably within the range from 130 nm to 220 nm, and more preferably, within the range from 150 nm to 180 nm. The thickness of the low-reflective metal oxide film 7c1 is preferably within the range from 30 nm to 80 nm, and more preferably, within the range from 40 nm to 60 nm. Also, the thickness of the transparent conductive layer 7d is preferably within the range from 100 nm to 300 nm, and more preferably, within the range from 150 nm to 250 nm.

If the thicknesses of the layers 7c1, 7c2, and 7d, constituting the lead-out wiring 7, are within the above-described ranges, the reflection factor of the lead-out wiring 7 can be restrained within the range from 3% to 5%, as well as the resistance of the lead-out-wiring 7 can be restrained to 4 Ω or less, and preferably within the range from 1.5 Ω to 3 Ω. These values are sufficient to provide superior display characteristics through the-combination of low light reflection and high conductivity.

In FIG. 5, an example is shown in which the conductive reflection-preventing layer 7c contains two layers. In the present invention, however, the conductive reflection-preventing layer 7c is not limited to this two-layer configuration, but may contain only a single layer. In this case, it is preferable that conductive reflection-preventing layer 7c be formed of a low-reflective metal film such as NiCu-based or Ni-based alloy. This low-reflective metal film combines the features of high conductivity and a low reflection factor, thus independently improves the conductivity of the lead-out wiring 7 and reducing the reflection factor thereof.

The lead-out wiring 6, likewise, may have the same constitution as the lead-out wiring 7 or alternatively may contain only a transparent conductive material such as ITO. In the latter case, ITO is acceptable in terms of resistivity as the line length of the lead-out wiring 6 is relatively short, and thus the extent of voltage drop is low as compared with the lead-out wiring 7. In the present invention, therefore, all or a part of the lead-out wiring 6 and 7 may be formed into a laminated structure comprising a conductive reflection-preventing layer and a transparent conductive layer.

As described above, according to the above-described liquid crystal display 1, at least a part or all of the lead-out wiring 7 that leads out the transparent electrode 25 to the terminal portion 10a of the substrate 10, is formed by laminating at least the transparent conductive layer 7d and the conductive reflection-preventing layer 7c. Therefore, the amount of reflected light from the lead-out wiring 7 can be reduced by decreasing the reflection factor of the lead-out wiring 7 by virtue of the conductive reflection-preventing layer 7c, thereby allowing a liquid crystal display 1 with high display performance to be achieved.

Also, since the conductive reflection-preventing layer 7c is laminated on the transparent conductive layer 7d, the conductivity of lead-out wiring 7 is improved, thereby preventing the occurrence of uneven display of the liquid crystal display 1.

Furthermore, since the conductive reflection-preventing layer 7c is disposed on the display surface 1a side, that is, on the side of the observer of the display, the amount of reflected light from the lead-out wiring 7 can be more effectively reduced, thereby enabling a liquid crystal display 1 with high display performance to be attained.

Moreover, by connecting the lead-out wiring 7, located on the first substrate 10 side, to the transparent electrode 25, located on the second substrate 20 side, through the intermediary of the anisotropic conductive resin 40, the transparent electrode 25 can be led out to the terminal portion 10a of the first substrate 10 via the lead-out wiring 7, thereby enabling driving ICs to be combined into a single driving IC.

While the present invention has been described with reference to what are at present considered to be the preferred embodiments, it is to be understood that various changes and modifications may be made thereto without departing from the present invention in its broader aspects and therefore, it is intended that the appended claims cover all such changes and modifications that fall within the true spirit and scope of the invention.

What is claimed is:

1. A liquid crystal display, comprising:
    first and second substrates opposing each other;
    a liquid crystal layer disposed between the first and second substrates;
    first and second transparent electrodes disposed on liquid crystal layer sides of said first and second substrates, respectively; and
    first and second lead-out wiring that respectively lead out the first and second transparent electrodes to a terminal portion of the first substrate, said lead-out wiring being formed on at least one of said first and second substrates, at least said second lead-out wiring containing a transparent conductive layer and a conductive reflection-preventing layer disposed more proximate to a display surface side of the liquid crystal display than said transparent conductive layer,
    wherein an anisotropic conductive resin is formed into a loop shape between said first and second substrates, and said liquid crystal layer is disposed inside said loop-shaped anisotropic conductive resin such that said liquid crystal layer is sandwiched between said first and second substrates;
    wherein said first lead-out wiring is formed on said first substrate;
    wherein said second lead-out wiring is formed on said first substrate, and said second transparent electrode and said second lead-out wiring are electrically connected by said anisotropic conductive resin; and
    wherein said conductive reflection-preventing layer comprises one of a laminated film formed of a metal film and a low-reflective metal oxide film, or a single layer film formed of a low-reflective metal film.

2. The liquid crystal display according to claim 1, wherein the first and second transparent electrodes are drivable by a single IC driver via the first and second lead out wiring.

3. The liquid crystal display according to claim 1, wherein the anisotropic conductive resin comprises conductive particles and binder resin.

4. The liquid crystal display according to claim 1, further comprising:
    phase difference plates and polarizing plates formed on a side of the first and second substrates distal to the liquid crystal layer;
    a first overcoat layer formed on the first transparent electrodes and a first alignment layer formed on the first overcoat layer and adjacent to the liquid crystal layer;
    a second overcoat layer formed on a reflector containing organic and metal films, the second transparent electrodes formed on the second overcoat layer, and a second alignment layer formed on the second overcoat layer and second transparent electrodes and adjacent to the liquid crystal layer.

5. The liquid crystal display according to claim 1, wherein the conductive reflection-preventing layer is at least one of Cr, Cr-oxide, Cu or Cu-oxide, Ni or Ni-oxide, NiCu-based alloy, or Ni-based alloy.

6. The liquid crystal display according to claim 1, wherein the conductive reflection-preventing layer is one of a NiCu-based alloy, or a Ni-based alloy.

7. The liquid crystal display according to claim 1, wherein the metal film is Cr and the low-reflective metal oxide film is Cr-oxide.

8. A method of driving a liquid crystal display using a single IC driver, comprising:
    fabricating a first and second lead-out wiring on one of two opposing substrates having a liquid crystal layer disposed therebetween such that at least a part of the first and second lead-out wiring contains a transparent conductive layer and a conductive reflection-preventing layer disposed more proximate to a display surface side of the liquid crystal display than the transparent conductive layer;
    fabricating first and second transparent electrodes disposed on liquid crystal layer sides of the opposing substrates; and
    electrically connecting the first and second transparent electrodes to a terminal portion of one of the substrates via the first and second lead-out wiring, the terminal portion configured to house the IC driver.

9. The method according to claim 8, further comprising:
establishing a boundary of an anisotropic conductive resin between the substrates within which the liquid crystal layer is disposed; and
electrically connecting the second transparent electrode and second lead-out wiring though the anisotropic conductive resin.

10. The method according to claim 8, further comprising one of laminating a metal film and a low-reflective metal oxide film to form the conductive reflection-preventing layer or forming the conductive reflection-preventing layer from a single layer low-reflective metal film.

11. The method according to claim 9, further comprising incorporating conductive particles in binder resin to form the anisotropic conductive resin.

12. The liquid crystal display according to claim 8, wherein the conductive reflection-preventing layer is at least one of Cr, Cr-oxide, Cu or Cu-oxide, Ni or Ni-oxide, NICu-based alloy, or Ni-based alloy.

13. The liquid crystal display according to claim 8, wherein the conductive reflection-preventing layer is one of a NiCu-based alloy, or a Ni-based alloy.

14. The liquid crystal display according to claim 8, wherein the metal film is Cr and the low-reflective metal oxide film is Cr-oxide.

* * * * *